US010268699B2

(12) United States Patent
Farenden et al.

(10) Patent No.: US 10,268,699 B2
(45) Date of Patent: Apr. 23, 2019

(54) SCHEMA GENERATION USING NATURAL LANGUAGE PROCESSING

(71) Applicant: International Business Machines Corporation, Armonk, NY (US)

(72) Inventors: Matthew C. Farenden, Cambridge (GB); Gareth A. Latty, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 15/065,945

(22) Filed: Mar. 10, 2016

(65) Prior Publication Data

US 2016/0283525 A1    Sep. 29, 2016

Related U.S. Application Data

(63) Continuation of application No. 14/666,532, filed on Mar. 24, 2015, now abandoned.

(51) Int. Cl.
*G06F 17/30* (2006.01)
*G06F 17/27* (2006.01)

(52) U.S. Cl.
CPC .... *G06F 17/30182* (2013.01); *G06F 17/2705* (2013.01); *G06F 17/2785* (2013.01)

(58) Field of Classification Search
CPC ......... G06F 17/30292; G06F 17/30182; G06F 17/3071; G06F 17/2705; G06F 17/2785
USPC .......... 707/803, 811, 806–809, 962
See application file for complete search history.

(56) References Cited

U.S. PATENT DOCUMENTS

| 6,968,332 B1* | 11/2005 | Milic-Frayling ............ G06F 17/30867 707/723 |
| 7,209,875 B2* | 4/2007 | Quirk ............... G06F 17/28 704/2 |
| 7,496,593 B2 | 2/2009 | Gardner et al. |
| 7,610,300 B2 | 10/2009 | Legault et al. |
| 7,849,049 B2 | 12/2010 | Langseth et al. |

(Continued)

FOREIGN PATENT DOCUMENTS

EP    1462950 A1    9/2004

OTHER PUBLICATIONS

Appendix P—List of IBM Patents or Patent Applications Treated as Related, 2 Pages.

(Continued)

*Primary Examiner* — Daniel A Kuddus
(74) *Attorney, Agent, or Firm* — Bryan D. Wells; Alexander G. Jochym (57) ABSTRACT

In a method for generating a schema for a corpus of data, a first corpus of data is received, wherein the first corpus of data includes unstructured text. A processor identifies a set of one or more entity relationships within the first corpus of data, wherein an entity relationship comprises a first entity, a second entity, and a specified relationship between the entities. A processor compares the set of one or more entity relationships to a second corpus of data, wherein the second corpus of data includes text of a subject matter different than the corpus of data. A processor determines a score for each entity relationship based on the comparison to the second corpus of data. A processor generates a schema for the first corpus of data based on the score for each entity relationship of the set of one or more entity relationships.

8 Claims, 4 Drawing Sheets

(56) References Cited

U.S. PATENT DOCUMENTS

| | | | |
|---|---|---|---|
| 7,912,703 | B2 | 3/2011 | Magdalen et al. |
| 7,930,322 | B2 | 4/2011 | MacLennan |
| 9,418,128 | B2* | 8/2016 | Li .................... G06F 17/30569 |
| 9,454,599 | B2 | 9/2016 | Golden et al. |
| 9,477,711 | B2 | 10/2016 | Goel et al. |
| 9,665,643 | B2* | 5/2017 | Li .................... G06F 17/30687 |
| 9,754,210 | B2* | 9/2017 | Xia ......................... G06N 5/04 |
| 2003/0175999 | A1* | 9/2003 | Mikawa ................ H01L 28/55 438/3 |
| 2003/0176999 | A1* | 9/2003 | Calcagno ............ G06F 17/279 704/9 |
| 2010/0223257 | A1* | 9/2010 | Milic-Frayling ........................... G06F 17/30867 707/722 |
| 2011/0078162 | A1* | 3/2011 | Nie .................. G06F 17/30867 707/754 |
| 2012/0310990 | A1 | 12/2012 | Viegas et al. |
| 2013/0173604 | A1* | 7/2013 | Li .................... G06F 17/30687 707/723 |
| 2013/0238621 | A1* | 9/2013 | Ganjam ............ G06F 17/30864 707/737 |
| 2013/0332478 | A1* | 12/2013 | Bornea ............ G06F 17/30292 707/763 |
| 2015/0227589 | A1* | 8/2015 | Chakrabarti ...... G06F 17/30525 707/748 |
| 2015/0269175 | A1* | 9/2015 | Espenshade ........ G06F 17/3097 706/47 |

OTHER PUBLICATIONS

Balasubraivianian et al., "Generating Coherent Event Schernas at Scale", Proceedings of the 2013 Conference on Empirical Methods in Natural Language Processing, Oct. 18-21, 2013, Seattle, Washington.

Chambers, Nathanael, "Event Schema Induction with a Probabilistic Entity-Driven Model", Proceedings of the 2013 Conference on Empirical Methods in Natural Language Processing, Oct. 18-21, 2013, Seattle, Washington, pp. 1797-1807, © 2013 Association for Computational Linguistics.

Lin, Thomas, "Knowledge-Guided Schema Discovery from Semi-Structured Text", University of Washington, Provided in Search dated Sep. 2, 2014, pp. 1-8.

Farenden et al., "Schema Generation Using Natural Language Processing", U.S. Appl. No. 14/666,532, filed Mar. 24, 2015, 29 pages.

* cited by examiner

SCHEMA GENERATION USING NATURAL LANGUAGE PROCESSING

BACKGROUND OF THE INVENTION

The present invention relates generally to the field of schema generation, and more particularly to using natural language processing to generate a schema for a corpus of data.

Natural language processing (NLP) integrates computer science, artificial intelligence, and linguistics to enable computer systems to accept (receive) inputs in a conventional human (natural) language. NLP has the ability to enable software to derive meaning from human or natural language input, which is referred to as natural language understanding.

An entity-relationship model is used to show and describe existing relationships within a set of data. Entities are linked with other entities by relationships that express the dependencies and requirements between the entities, for example, one building may be divided into zero or more apartments, but one apartment can only be located in one building. Entities may be characterized by various properties or attributes. Diagrams created to represent these entities, attributes, and relationships graphically are called entity-relationship diagrams. Entities can be thought of as nouns for example: a computer, an employee, a song, a mathematical theorem. Entities and relationships can both have one or more attributes, for example: an employee entity might have a Social Security Number (SSN) attribute.

A relationship captures how entities are related to one another. Relationships can be thought of as verbs, linking two or more nouns. Examples: an owns relationship between a company and a computer (e.g., company owns computer), a supervises relationship between an employee and a department (e.g., employee supervises department), a performs relationship between an artist and a song (e.g., artist performs song), a proved relationship between a mathematician and a theorem (e.g., mathematician proved theorem).

An entity is a set of one or more details that are held about a real-world object such as a person, location, or bank account. An entity is a type of item. A link is an association between two entities, such as an ownership relationship between a person and a vehicle. A property is a single piece of information about an entity.

A schema is a way to define the structure, content, and to some extent, semantics of data. With a defined schema, a user can create instances of data structures that conform to that schema and exchange the data structures, such that others will be able to use that same schema to correctly interpret each instance.

A corpus is a set of structured and/or unstructured text. Corpora are used, for example, for statistical analysis and hypothesis testing, checking occurrences, and validating linguistic rules within a specific language territory. Annotating corpora can increase their functionality.

SUMMARY

Aspects of an embodiment of the present invention disclose a method, computer program product, and computing system for generating a schema for a corpus of data. In the embodiment, the first corpus of data is received, wherein the first corpus of data includes, at least, unstructured text. A processor identifies a set of one or more entity relationships within the first corpus of data, wherein an entity relationship comprises a first entity, a second entity, and a specified relationship between the first entity and the second entity. A processor compares the set of one or more entity relationships to a second corpus of data, wherein the second corpus of data includes, at least, text of a subject matter different than the first corpus of data. A processor determines a score for each entity relationship of the set of one or more entity relationships based on, at least, the comparison to the second corpus of data. A processor generates a schema for the first corpus of data based on, at least, the score for each entity relationship of the set of one or more entity relationships.

DETAILED DESCRIPTION

Embodiments of the present invention recognize that current data modeling and schema creation is a primarily manual process. For example, skilled experts may meet with domain experts to create a schema, looking at sample data sets and iteratively constructing and testing data models to produce an appropriate schema. Embodiments of the present invention recognize that schemas are highly specific to the use case and the user—meaning that each deployment of a system will generally require a custom schema to suit the specific needs of the use case and the user.

Embodiments of the present invention recognize that if an incorrect schema is generated, the final system may be inefficient or unusable. If the deploying experts do not accurately understand the data or the domain experts do not take into account some part of the subject domain, the final system may not be able to accurately answer queries.

Embodiments of the present invention address inefficiencies associated with schema generation. A corpus of data is gathered to identify entities and relationships within that corpus, and a schema is generated to represent the identified entities and relationships located within the corpus of data.

The present invention will now be described in detail with reference to the Figures.

Figure 1:
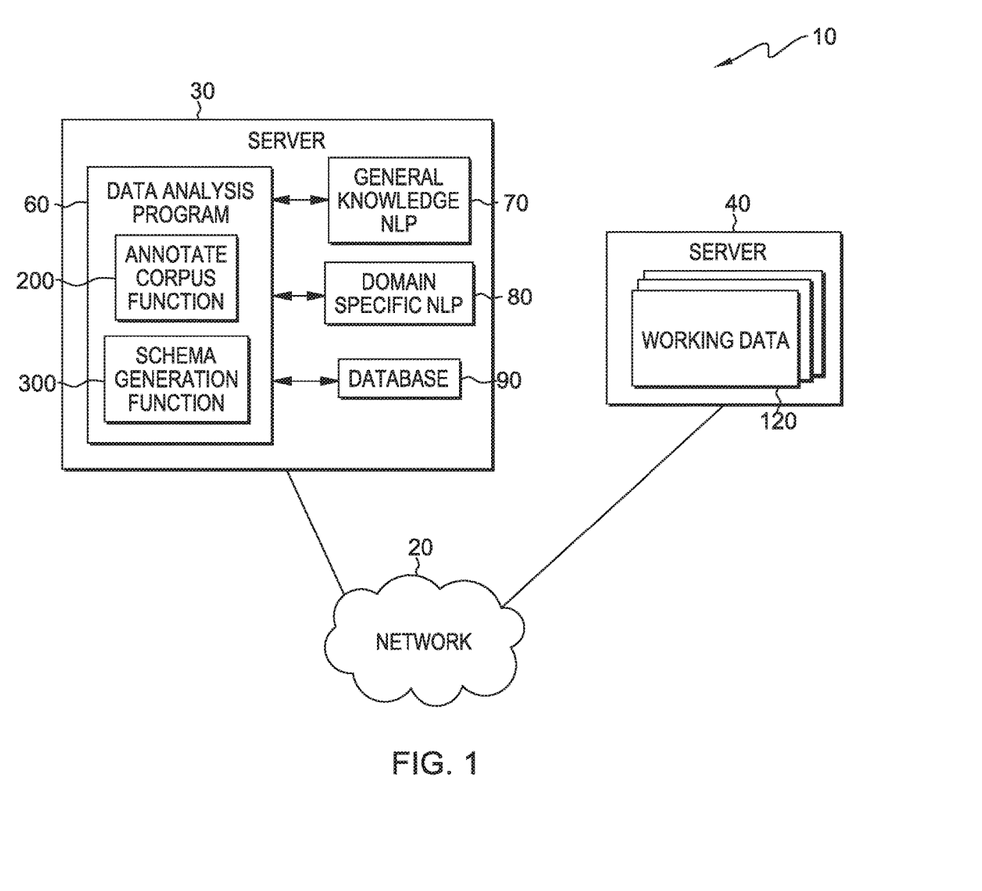
FIG. 1 is a functional block diagram illustrating a computing environment, in accordance with an embodiment of the present invention.

FIG. 1 depicts a diagram of computing environment 10 in accordance with one embodiment of the present invention. FIG. 1 provides an illustration of one embodiment and does not imply any limitations with regard to the environments in which different embodiments may be implemented.

In the depicted embodiment, computing environment 10 includes server 30 and server 40 interconnected over network 20. Network 20 may be a local area network (LAN), a wide area network (WAN) such as the Internet, any combination thereof, or any combination of connections and protocols that will support communications between server 30 and server 40 in accordance with embodiments of the invention. Network 20 may include wired, wireless, or fiber optic connections. Computing environment 10 may include additional computing devices, servers, or other devices not shown.

Server 30 may be a management server, a web server, or any other electronic device capable of processing program instructions, and receiving and sending data. In some embodiments, server 30 may be a laptop computer, tablet computer, netbook computer, personal computer (PC), a desktop computer, or any programmable electronic device capable of communicating with server 40 via network 20. In other embodiments, server 30 may represent a server computing environment utilizing multiple computers as a server system, such as in a cloud computing environment. In another embodiment, server 30 represents a computing environment utilizing clustered computers and components to act as a single pool of seamless resources. Server 30 contains data analysis program 60, annotate corpus function 200, schema generation function 300, general knowledge natural language processor (NLP) 70, domain specific NLP 80, and database 90. Server 30 may include components, as depicted and described in further detail with respect to FIG. 4.

Server 40 may be a management server, a web server, or any other electronic device or computing environment capable of processing program instructions, and receiving and sending data. In some embodiments, server 40 may be a laptop computer, tablet computer, netbook computer, personal computer (PC), a desktop computer, or any programmable electronic device capable of communicating with server 30 via network 20. In other embodiments, server 40 may represent a server computing environment utilizing multiple computers as a server system, such as in a cloud computing environment. In another embodiment, server 40 represents a computing environment utilizing clustered computers and components to act as a single pool of seamless resources. Server 40 contains working data 120. Server 40 may include components, as depicted and described in further detail with respect to FIG. 4.

Working data 120 is a corpus that may contain structured, semi-structured, and/or unstructured data. In one embodiment, working data 120 is a large set of text. Working data 120 contains text in a single language (monolingual corpus) or text data in multiple languages (multilingual corpus). Working data 120 may include names, locations, dates, times, persons, or any property or any items of interest that describe an entity. In some embodiments, working data 120 is a collection of data to be analyzed and sorted. Working data 120 may be a collection of reports or a collection of documents. Working data 120 can be any body of data a user wishes to sort, identify, and/or analyze. Working data 120 can be specific to a particular domain. Working data can include data in different media formats (e.g., text or files).

In one embodiment, data analysis program 60 operates to identify and score entities and the respective properties of the entities from working data 120. Data analysis program 60 utilizes annotate corpus function 200 and schema generation function 300 to identify entities and relationships from working data 120 and to create a schema for working data 120. In some embodiments, data analysis program 60 sends and/or receives data from general knowledge NLP 70. In some embodiments, data analysis program 60 sends and/or receives data from domain specific NLP 80. In some embodiments, data analysis program 60 sends data, scored and/or unscored, to general knowledge NLP 70, domain specific NLP 80, and database 90. In some embodiments, data analysis program 60 resides on server 30. In other embodiments, data analysis program 60 may reside on another server, or another computing device, provided that data analysis program 60 has access to general knowledge NLP 70, domain specific NLP 80, database 90, and working data 120.

Annotate corpus function 200 operates to identify and score data within working data 120. In some embodiments, annotate corpus function 200 utilizes general knowledge NLP 70 and domain specific NLP 80 to create a scored list of entities and possible relationships. In some embodiments, annotate corpus function 200 operates to assign a semantic score to the scored list of entities and possible relationships. In other embodiments, annotate corpus function 200 operates to merge duplicate pairs that result from semantic scores. In some embodiments, annotate corpus function 200 is a function of data analysis program 60. In other embodiments, annotate corpus function 200 is a standalone program capable of performing the operations described herein. In some embodiments, annotate corpus function 200 stores scored data to database 90. In some embodiments, annotate corpus function 200 resides on server 30. In other embodiments, annotate corpus function 200 may reside on another server, or another computing device, provided that annotate corpus function 200 has access to data analysis program 60, general knowledge NLP 70, domain specific NLP 80, database 90, and working data 120.

Schema generation function 300 operates to create a model schema. In some embodiments, schema generation function 300 uses data from a graph generated by annotate function 200 (the generation of the graph will be discussed in more detail with regard to FIG. 2) to build a schema. In one embodiment, schema generation function 300 uses heuristics with a generated graph to create a schema that is representative of the data within working data 120. In some embodiments, schema generation function 300 uses the generated graph to construct and provide contextual information to facilitate the generation of the final schema. In some embodiments, schema generation function 300 retrieves stored data from database 90. In other embodiments, schema generation function 300 identifies data within working data 120. In some embodiments, schema generation function 300 analyzes the scored, structured graph. In other embodiments, schema generation function 300 identifies properties of entities within working data 120. In some embodiments, schema generation function 300 sends data to database 90. In some embodiments, schema generation function 300 resides on server 30. In other embodiments, schema generation function 300 may reside on another server, or another computing device, provided that schema generation function 300 has access to server 30, data analysis program 60, general knowledge NLP 70, domain specific NLP 80, database 90, and working data 120. In some embodiments, schema generation function 300 is a function of data analysis program 60. In other embodiments, schema generation function 300 is a standalone program capable of performing the operations described herein.

Domain specific NLP 80 is an NLP that is trained on domain specific information to identify entities, words, objects, and any other data within working data 120. In some embodiments, domain specific information is information and/or definitions within a particular context, for example, a police database, medical records, housing market information, or other context. In the example of a police database, a domain specific NLP 80 recognizes words and entities in the context of law enforcement terminology. In embodiments of the present invention, data identified by domain specific NLP 80 is analyzed by general knowledge NLP 70 at the request of data analysis program 60, and/or annotate corpus function 200. In some embodiments, domain specific NLP 80 sends data to data analysis program 60. In some embodiments, domain specific NLP 80 resides on server 30. In other embodiments, domain specific NLP 80 may reside on another server, or another computing device, provided that domain specific NLP 80 has access to server 30, data analysis program 60, database 90, and working data 120.

General knowledge NLP 70 is an NLP trained on general knowledge. General knowledge may be in the form of an encyclopedia, a dictionary, or any source that provides general information and definitions of words and various contexts of words or entities. General knowledge may be electronic data, such as text. In some embodiments, general knowledge NLP 70 may be used to identify what information working data 120 contains to provide semantic meaning to identified entities. In other embodiments, general knowledge NLP 70 identifies semantically linked entities. In some embodiments, general knowledge NLP 70 provides data for annotate corpus function 200 to build a graph to illustrate the relationships between semantically identified entities (scored and unscored). In some embodiments, general knowledge NLP 70 sends data to data analysis program 60 for analysis. In some embodiments, general knowledge NLP 70 resides on server 30. In other embodiments, general knowledge NLP 70 may reside on another server, or another computing device, provided that general knowledge NLP 70 has access to server 30, data analysis program 60, and database 90.

In one embodiment, database 90 is a repository that may be written and/or read by data analysis program 60, annotate corpus function 200, schema generation function 300, general knowledge NLP 70, and domain specific NLP 80. Data, such as working data 120, stored on database 90 may be any combination of the following: annotated entities (scored and/or unscored), domain entities (scored and/or unscored), entity-relationship data, semantic scores, NLP values, pairs (merged and unmerged, which are further discussed in FIG. 3), or other information relevant to identifying, analyzing, and/or scoring contents within working data 120 or other programs or functions within computing environment 10. In one embodiment, database 90 resides on server 30. In other embodiments, database 90 may reside on another server or another computing device, provided that database 90 is accessible to data analysis program 60, annotate corpus function 200, and schema generation function 300.

Figure 2:
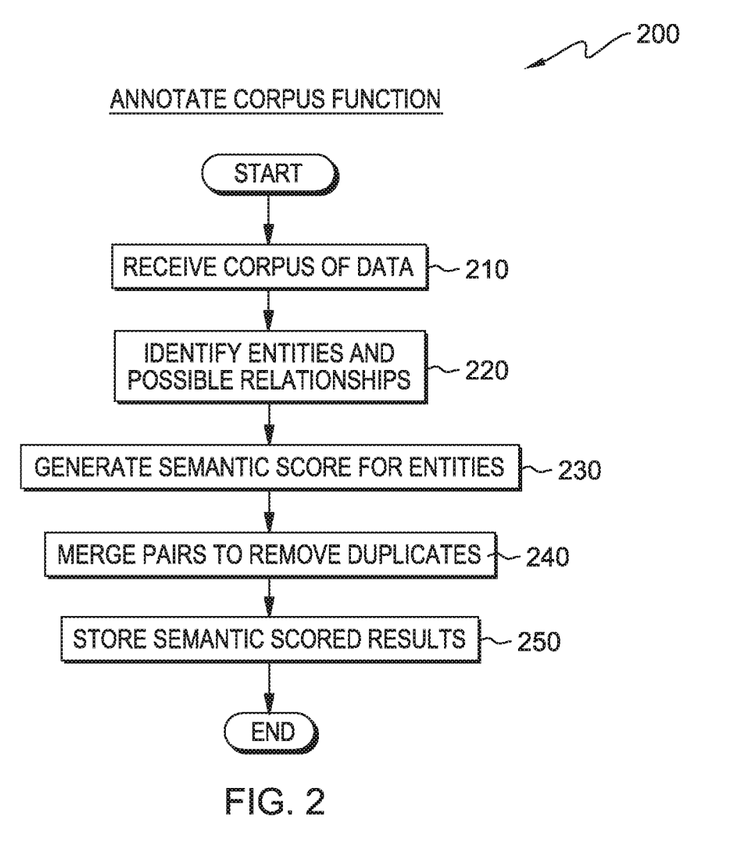
FIG. 2 is a flowchart depicting operational steps of an annotate corpus function, a function of a data analysis program, for identifying and scoring entities within a corpus of data, in accordance with an embodiment of the present invention.

FIG. 2 is a flowchart depicting operational steps of annotate corpus function 200, a function of data analysis program 60, executing within the computing environment of FIG. 1. Annotate corpus function 200 analyzes working data 120 to identify the entities working data 120 contains. After entities are identified, annotate corpus function 200 scores the entities based on the relevance the entity has in working data 120 and the desired schema.

In one embodiment, initially, a user, such as a user at server 40, collects, creates, or otherwise gathers data. The quantity of data gathered and the type of data collected may vary based on the data collection techniques and preferences of the user. The user may gather all, or some, of the data and create a corpus of data. This corpus of data may be, as described in the current embodiment, working data 120. Working data 120 can originate from one or multiple sources.

In step 210, annotate corpus function 200 receives the corpus of data, working data 120. In some embodiments, annotate corpus function 200 receives working data 120 from server 40. In other embodiments, annotate corpus function 200 accesses working data 120 on server 40 via network 20, in response to an instruction from a user at server 30. In one embodiment, working data 120 is data prepared into a corpus by a user. In one embodiment, annotate corpus function 200 receives a portion of working data 120. In another embodiment, annotate corpus function 200 receives all of working data 120. In one embodiment, annotate corpus function 200 collects working data 120 within a specified time frame. For example, annotate corpus function 200 could collect data created and/or updated from month/day/year to month/day/year. Alternatively, annotate corpus function 200 may collect all of working data 120, regardless of time frame.

In step 220, annotate corpus function 200 causes domain specific NLP 80 to analyze and identify entities and possible relationships in working data 120 within the context of a specific domain. Domain specific NLP 80 receives a corpus of data, working data 120. After domain specific NLP 80 receives working data 120, domain specific NLP 80 analyzes working data 120 to identify entities and possible relationships an entity has with another entity or other entities or potential properties. Domain specific NLP 80 assigns a score to identified entities and identified relationships. In one embodiment, domain specific NLP 80 assigns scores based on the frequency the entities and/or relationships occur within working data 120. In some embodiments, domain specific NLP 80 identifies and defines entities and relationships. In some embodiments, annotate corpus function 200 generates a list that contains every possible relationship identified by domain specific NLP 80 from working data 120. In other embodiments, annotate corpus function 200 generates a list that contains some of the possible relationships identified by domain specific NLP 80 from working data 120. In some embodiments, annotate corpus function 200 causes domain specific NLP 80 to perform a grammatical analysis of working data 120 to identify entities and the potential relationships the entities have with other entities and to identify the potential properties of the entities. Based on the domain specific NLP 80 analysis, domain specific NLP 80 generates a set of annotated and scored domain entities from working data 120. A domain entity is an item in working data 120 having at least one property.

In one example, a person is an entity, while brown hair is a property of the "person" entity. To annotate an entity is to assign descriptive information, which could be text or a graph, to a particular entity in order to differentiate the particular entity from other entities. In one embodiment, descriptive information is in the form of metadata. In some embodiments, entity-relationships could be read as "entity X has relationship Y." In such an example, "X" is an entity and "Y" is a property of entity "X." Following the earlier example, a person has brown hair. "Person" is the entity and "hair" is the property. Annotate corpus function 200 generates a set of annotated entities and properties.

In another example, working data 120 contains data from a police database. In this example, domain specific NLP 80 has a law enforcement domain. Annotate corpus function 200 causes domain specific NLP 80 to analyze and identify entities and possible relationships in working data 120 within the context of law enforcement. In response to annotate corpus function 200, domain specific NLP 80 assigns a score, based on the law enforcement specific domain, to the identified entities and identified relationships. Annotate corpus function 200 then causes domain specific NLP 80 to annotate the scored results, creating a set of annotated results.

In step 230, annotate corpus function 200 generates a semantic score for identified entities (see step 220) within working data 120. Annotate corpus function 200 generates a semantic score for identified entities by causing an NLP instance trained against a general knowledge domain, e.g., general knowledge NLP 70, to analyze the set of annotated results (see step 220). During the analysis of the annotated results, general knowledge NLP 70 identifies semantically related relationships in the context of general world knowledge. Annotate corpus function 200 causes general knowledge NLP 70 to generate a semantic score for the identified entity relationships within working data 120 in the context of general world knowledge. In one embodiment, annotate corpus function 200 identifies semantically related relationships by using criteria such as identifying the relevance the entity relationship has within working data 120, identifying the frequency of the entity and relationship in working data 120, identifying how the entity appears in working data 120, along with other criteria that may be pertinent to identifying semantically related relationships.

In some embodiments, entity relationship representations have concepts such as, for example, "people have eyes but eyes do not have people." In the "people have eyes but eyes do not have people" example, "have" represents a unidirectional relationship in the context of people and eyes, which can be used as a constraint that can be applied to the analysis of working data 120. The concepts have real world rules regarding relationships. In some embodiments, the entities within working data 120 are scored based on general knowledge of the context of the relationship that is being investigated. In some embodiments, general knowledge NLP 70 generates a set of results that contain entities and relationships with a semantic score for each pair of entities and entity relationships. In one embodiment, the semantic score is the total value for the entity relationship derived from the understanding general knowledge NLP 70 has of the real world. The entity relationship that was identified by domain specific NLP 80 is compared to the semantically related entity relationships identified by general knowledge NLP 70. The score generated is a combination of the frequency the entity relationships appear in both data sets (the result set from domain specific NLP 80 and the result set from general knowledge NLP 70).

For example, continuing with the law enforcement example, after domain specific NLP 80 generates a set of annotated results (see step 220) in the context of law enforcement, annotate corpus function 200 causes general knowledge NLP 70 to analyze the annotated set of results and identify semantically related relationships in the context of general world knowledge. In this example, general knowledge NLP 70 generates a semantic score based on the frequency the entity relationships appear in the context of law enforcement (from domain specific NLP 80) and in the context of general knowledge (from general knowledge NLP 70).

One example of a semantic score is as follows: person (10)<has (5)>brother(10)–semantic score (25* general knowledge NLP Value). In such an example, the number in parenthesis indicates the frequency of occurrence of the item within working data 120. Further, the first word (e.g., person) is the entity, the second word (e.g., has) is the relationship, and the third word (e.g., brother), is the property. "Property" is a related entity. The relationship may become a "property" when the final schema is defined. In one embodiment, each relationship will have two scores. One score correlates to the frequency "x constraint y" relationship is observed by domain specific NLP 80. The second number is the frequency the same relationship is observed by general knowledge NLP 70.

In step 240, in some embodiments, annotate corpus function 200 merges the identified entity-relationship pairs (see step 230) to remove duplicates. For example, an entity may appear once and have multiple relationships associated with the entity. For example, John is an entity that appears once. John has multiple relationships, such as, John owns a car, John has brown hair, and John lives in a house. During the merging process, annotate corpus function 200 takes a count to identify the frequency of identified entities and/or relationships in working data 120. In some embodiments, a symbol represents an entity and all of the relationships an entity has in working data 120. In some embodiments, annotate corpus function 200 maintains a count of an entity and all of the entity's relationships to identify how often that entity or relationship occurs within working data 120. In some embodiments, annotate corpus function 200 uses a list of symbols to generate a graph showing all entities and their respective relationships as a single unit, defining how the symbols are related to each other. In some embodiments, the conceptual graph is a complete map of every relationship within working data 120 that is defined by general knowledge NLP 70. In one embodiment, annotate corpus function 200 generates a structured graph with general knowledge semantic scores. Data within domain specific NLP 80 can be represented in one or more ways on the graph. In some embodiments, a user selects how he or she wants particular entities represented in the final schema. In one embodiment, annotate corpus function 200 generates a graph showing/identifying the relationship(s) an entity in working data 120 has with other entities and/or potential properties in working data 120.

In step 250, annotate corpus function 200 stores the semantic scored results in database 90. In another embodiment, annotate corpus function 200 stores the scored results to another location on server 30, or on a different server, provided the location to which the score results are stored is accessible to schema generation function 300. In one embodiment, annotate corpus function 200 stores the semantic scored results in multiple locations, provided the location to which the scored results are stored is accessible to schema generation function 300.

Figure 3:
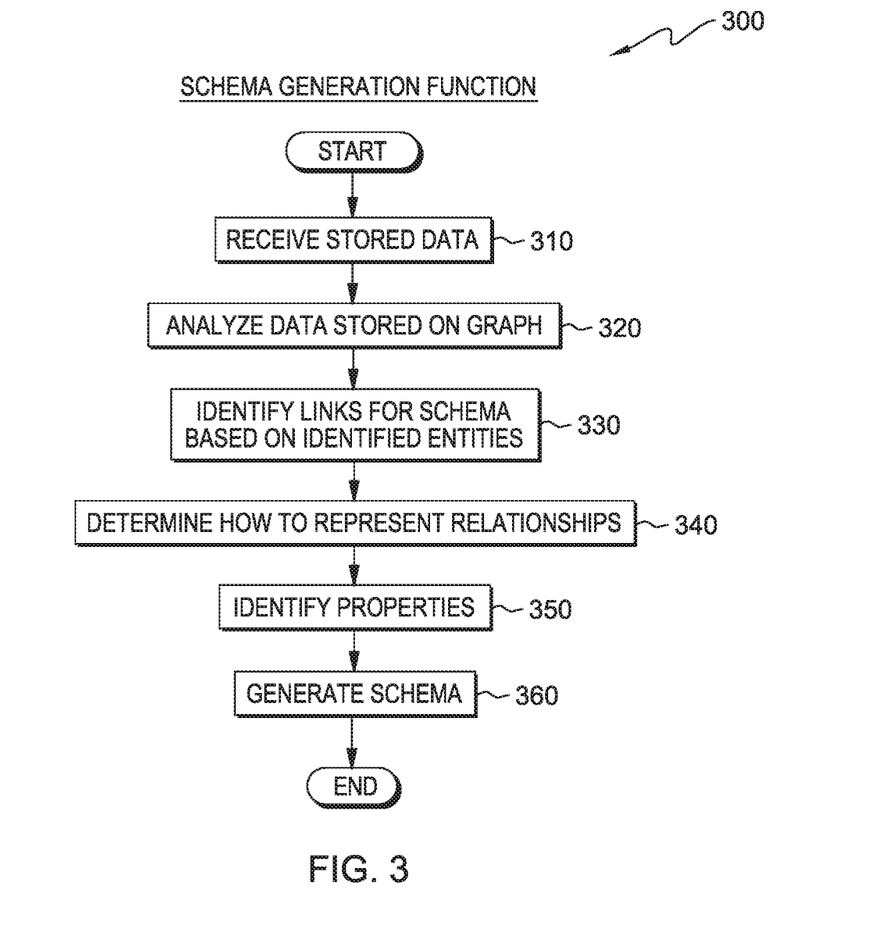
FIG. 3 is a flowchart depicting operational steps of a schema generation function, a function of a data analysis program, for generating a schema for a corpus of data, in accordance with an embodiment of the present invention.

FIG. 3 is a flowchart depicting operational steps of schema generation function 300, a function of data analysis program 60, executing within computing environment 10 of FIG. 1. Schema generation function 300 analyzes data pertaining to entities, properties, and links and generates a schema based on the relevance the entities, properties, and links have in the projected schema. Schema generation function 300 creates a structured schema from data that was previously unstructured.

In one embodiment, initially, annotate corpus function 200 analyzes working data 120. Based on the analysis, annotate corpus function 200 identifies and scores entities, properties, and potential relationships based on the frequency the entities, properties, and/or relationships appear in working data 120. Annotate corpus function 200 creates a graph describing and/or illustrating the relationships between entities and various properties.

In step 310, schema generation function 300 receives data stored by annotate corpus function 200. In one embodiment, schema generation function 300 receives data stored to database 90. In another embodiment, schema generation function 300 receives data from domain specific NLP 80. In one embodiment, schema generation function 300 receives part of or all of working data 120. In another embodiment, schema generation function 300 receives part of or all of the data stored by annotate corpus function 200. In one embodiment, a user can select the type and quantity of entities, properties, and links schema generation function 300 should receive and analyze. In some embodiments, schema generation function 300 receives data stored by annotate corpus function 200 within a specified time frame. In another embodiment, schema generation function 300 receives data stored by annotate corpus function 200 in all time frames.

In step 320, schema generation function 300 analyzes the quantified, stored data on a graph generated by annotate corpus function 200. In one embodiment, schema generation function 300 identifies relevant entities for a model schema using heuristics. Heuristics is a technique designed for solving a problem more quickly when classical methods are too slow, or for finding an approximate solution when classical methods fail to find an exact solution, by using mental shortcuts (e.g., rule of thumb, educated guess, intuitive judgment, profiling) to ease the cognitive load of making a decision. In some embodiments, heuristics is applied based on preselected properties defined by a user at a computing device connected to network 20 that is capable of communicating with schema generation function 300. Preselected properties may include domain specific scores, entity-relationships, common neighbors (closely related entities), and other properties or categories that identify distinctions in the data.

Schema generation function 300 identifies which entities should be incorporated into the schema based on factors, such as, but not limited to, the frequency an entity is found in working data 120 and semantic scores assigned to entities, properties, and relationships. The higher the frequency, the higher the score the entity receives. A higher score typically indicates a higher relevance an entity may have in the data and schema (within the context of the search). Schema generation function 300 creates a hierarchy of entities and relationships generated on the graph. The hierarchy identifies the relevance particular entities and relationships have in the graph generated by annotate corpus function 200. In some embodiments, schema generation function 300 selects entities schema generation function 300 identifies as most relevant. Schema generation function 300 identifies relevant entities by comparing the frequency entities appear throughout the generated hierarchy and by comparing the semantic scores of the entities. In some embodiments, the simple comparisons identified by schema generation function 300 identify how many, and which, entities the final schema should include. In some embodiments, entities are further divided into subtypes.

For example, police, teachers, and doctors are subtypes of "people." Schema generation function 300 utilizes the subtypes to build a new hierarchy. In the resulting schema (see step 360), a user may define and select entities that should be included in the hierarchy. In some embodiments, schema generation function 300 selects certain entities while negating some entity subtypes that may have initially be chosen.

In step 330, schema generation function 300 identifies the relationship links for the schema based on identified entities. For example, in one embodiment, "brother" is identified as a bi-directional relationship (link) between two persons (entities). In other embodiments, domain specific NLP 80 may discard some relationships (links) due to the low frequency of the relationships (links) in working data 120. Once relational links are created, schema generation function 300 can highlight portions of the graph containing the entity(ies) of interest.

In step 340, schema generation function 300 determines how to represent a linked entity-property relationships based on the context of the graph generated by annotate corpus function 200. In some embodiments, relationships are created by domain specific NLP 80 in a similar manner to the creation of entities. Schema generation function 300 compares different types of relationships (links) between two nodes on the graph and calculates which relationships (links) are most relevant to the context of the graph. In one embodiment, a link is unidirectional. For example, a person can have eyes but eyes cannot have a person. In another embodiment, the link between entities is bidirectional. For example, Jack and Tom are brothers. Jack is Tom's brother, and Tom is Jack's brother. In some embodiments, a user sets the direction of the link. In other embodiments, a user receives a suggested direction from schema generation function 300 based on the direction of identified relationships.

In step 350, schema generation function 300 identifies properties that belong to each entity based on weighted relationships, in addition to how frequently properties appear. In one embodiment, schema generation function 300 analyzes the graph to identify properties of entities. In one embodiment, schema generation function 300 analyzes the frequency that an entity and property appear together. Schema generation function 300 may weigh relationships based on the semantic score threshold of the entity, property, and/or link. For example, schema generation function 300 may disregard the inclusion of an entity, property, and/or link with a low semantic score. Further, schema generation function 300 may regard entities, properties, and/or links with medium semantic scores as secondary entities, properties, and/or links. In addition, schema generation function 300 may regard entities, properties, and/or links with high semantic scores as primary entities, properties, and/or links.

In step 360, schema generation function 300 generates a schema based on identified entities and properties. In some embodiments, schema generation function 300 analyzes the scores of entities, properties, and links to generate a schema based on those scores. In some embodiments, a schema identifies the content working data 120 contains and the depth of the content, providing a framework for data inquires.

Figure 4:
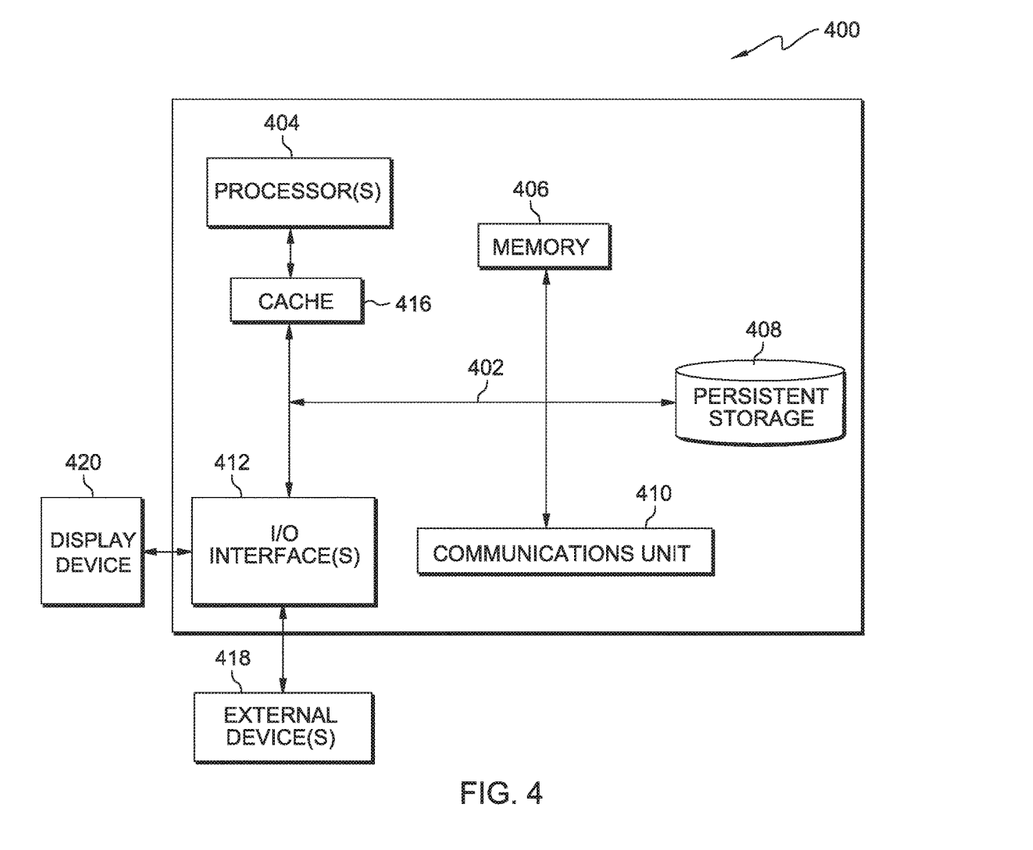
FIG. 4 is a block diagram of components of the servers, in accordance with an embodiment of the present invention.

FIG. 4 depicts a block diagram 400 of components of server 30 and server 40, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 30 and server 40 each includes, respectively, communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Data analysis program 60, annotate corpus function 200, schema generation function 300, general knowledge NLP 70, domain specific NLP 80, and database 90 may each be stored in persistent storage 408 of server 30 and in memory 406 of server 30 for execution and/or access by one or more of the respective computer processors 404 via cache 416. Working data 120 may be stored in persistent storage 408 of server 40 and in memory 406 of server 40 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Data analysis program 60, annotate corpus function 200, schema generation function 300, general knowledge NLP 70, domain specific NLP 80, and database 90 may be downloaded to persistent storage 408 of server 30 through communications unit 410 of server 30. Working data 120 may be downloaded to persistent storage 408 of server 40 through communications unit 410 of server 40.

I/O interface(s) 412 allows for input and output of data with other devices that may be connected to server 30 and server 40. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., data analysis program 60, annotate corpus function 200, schema generation function 300, general knowledge NLP 70, domain specific NLP 80, and database 90, can be stored on such portable computer readable storage media and can be loaded onto persistent storage 408 of server 30 via I/O interface(s) 412 of server 30. Software and data used to practice embodiments of the present invention, e.g., working data 120, can be stored on such portable computer readable storage media and can be loaded onto persistent storage 408 of server 40 via I/O interface(s) 412 of server 40. I/O interface(s) 412 also connect to a display device 420.

Display device 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a schema for a corpus of data, the method comprising:

receiving, by one or more processors, a corpus of working data, wherein the corpus of working data includes, at least, unstructured text;

a domain-specific natural language processor identifying, by one or more processors, a set of one or more entity relationships within the corpus of working data, wherein the domain-specific natural language processor is trained on a domain-specific corpus including information within a domain of the corpus of working data, and wherein an entity relationship comprises a first entity, a second entity, and a specified relationship between the first entity and the second entity;

the domain-specific natural language processor determining, by one or more processors, a first score for each entity relationship of the set of one or more entity relationships based on a respective frequency with which each entity relationship occurs in the corpus of working data, and in response, the domain-specific natural language processor generating, by one or more processors, a set of annotated results based on and representing the set of one or more entity relationships and the first score for each entity relationship;

a general knowledge natural language processor comparing, by one or more processors, the set of annotated results to the corpus of working data, wherein the general knowledge natural language processor is trained on a general-knowledge corpus including information outside of the domain of the domain-specific corpus and the domain of the corpus of working data;

the general knowledge natural language processor determining, by one or more processors, a second, semantic score for each entity relationship of the set of one or more entity relationships based on a respective semantic relevance of each entity relationship within the corpus of working data, and in response, the general knowledge natural language processor generating, by one or more processors, a set of semantically-scored results based on and representing the semantic relevance of each entity relationship within the corpus of working data; and generating, by one or more processors, a schema for the corpus of working data based on the set of annotated results and the set of semantically-scored results for each entity relationship within the corpus of working data.

2. The method of claim 1, further comprising:

generating, by one or more processors, a graph, wherein the graph illustrates the set of one or more entity relationships and merges duplicate entities into a single entity.

3. The method of claim 2, wherein generating the schema for the corpus of working data comprises:

generating, by one or more processors, the schema for the corpus of working data based on, at least, a hierarchy indicated within the graph and by the first score for each entity relationship of the set of one or more entity relationships.

4. The method of claim 1, wherein the general-knowledge corpus comprises an encyclopedia and a dictionary.

5. The method of claim 1, wherein the second entity of an entity relationship of the set of entity relationships is an attribute of the first entity.

6. The method of claim 4, wherein the domain-specific corpus comprises a police database.

7. The method of claim 4, wherein the domain-specific corpus comprises medical records.

8. The method of claim 4, wherein the domain-specific corpus comprises housing market information.

\* \* \* \* \*